United States Patent [19]

Parks

[11] Patent Number: 5,355,251

[45] Date of Patent: Oct. 11, 1994

[54] LIQUID CRYSTAL DISPLAY DEVICE WITH OCTAGONAL CELL PROVIDING INCREASED WIRING DENSITY

[75] Inventor: Terry J. Parks, Round Rock, Tex.

[73] Assignee: Dell U.S.A. L.P., Austin, Tex.

[21] Appl. No.: 54,371

[22] Filed: Apr. 28, 1993

[51] Int. Cl.⁵ ............................................. G02F 1/1343
[52] U.S. Cl. ...................... 359/354; 359/58; 359/59
[58] Field of Search ................ 359/54, 58, 59, 60; 345/205, 206

[56] References Cited

U.S. PATENT DOCUMENTS 5,068,748 11/1991 Ukai et al. ............................. 359/59
5,121,236 6/1992 Ukai et al. ............................. 359/59

*Primary Examiner*—William L. Sikes
*Assistant Examiner*—Huy Mai
*Attorney, Agent, or Firm*—James Huffman; Kevin Daffer

[57] ABSTRACT

A liquid crystal display (LCD) of high visual quality and having a high density wiring arrangement is provided. The LCD can accommodate up to four addressing and/or control conductors placed across the display and between columns and rows of display electrodes. If four conductors are utilized, those conductors can be arranged as a stacked pair placed between rows and a stacked pair placed between columns of display electrodes. At areas where one stacked pair of conductors intersect the other, a plurality of cross-over regions exists which provide vias for routing the conductors through the region as well as for connecting the conductors to a control circuit within each region. Each control circuit includes a pass-gate transistor for receiving two addressing conductors and a memory element capable of receiving two power conductors. Thus, by using stacked pairs of conductors, the LCD hereof provides complete routing of two addressing conductors and two power conductors in the stacked pairs to their respective destinations in order to achieve buffered, long-term charge at each display electrode.

22 Claims, 5 Drawing Sheets

LIQUID CRYSTAL DISPLAY DEVICE WITH OCTAGONAL CELL PROVIDING INCREASED WIRING DENSITY

BACKGROUND OF THE INVENTION

1. Field of the Invention

This invention relates to a liquid crystal display of high visual quality and more particularly to a high density wiring arrangement for controlling the liquid crystal display.

2. Background of the Relevant Art

The visual quality of an image depicted upon a liquid crystal display (LCD) is often determined by several factors such as contrast, resolution and speed. Operating as light modifiers, pixels within the LCD act to either transmit a remote, ambient light source or block that source. The difference between the amount of light transmitted versus that which is blocked is often called the "contrast ratio." A LCD having a higher contrast ratio is capable of producing images that are sharper and clearer than LCDs having lower contrast ratio. High contrast ratio can be achieved by ensuring the control circuit for each pixel area is either completely on or completely off. Recent advances in thin-film transistor (TFT) technology allows the control circuitry for each pixel to fully drive the corresponding pixel to either an on or off state. A LCD having TFTs placed adjacent each pixel to enduce full operational range of the pixel is often referred to as an "active matrix" display.

TFTs are also advantageously used to increase the speed of an object depicted on the LCD. A quickly moving object or image can be registered without "ghosting" or "smearing" the image only if the amount of current and/or voltage to the TFT is carefully controlled. Furthermore, attention must be paid to minimizing cross-coupling between control conductors or wires feeding the TFTs. One method in which to improve the visual quality of a moving image and thereby reduce ghosting and smearing is to ensure the TFT associated with each pixel turns on and off quickly. While the speed of any particular LCD is somewhat dependent upon the amount of time it takes the liquid crystal media to respond to an electric field, speed is more so dependent upon the rapidity by which the control circuit or LCD operates. By maintaining TFT operation within its linear range, the pixel or display electrode attached to the source-drain path of the TFT can be modulated more quickly to ensure rapid appearance or disappearance of corresponding electric field. It is important that the TFT not be driven deeply into the saturation region, for operation in the saturation region will lengthen the response time of the display electrode.

For many LCD applications such as flat screen televisions and computer monitors, it is important that the display exhibit high resolution. To increase resolution, pixel area or display electrode area associated with high resolution LCDs must be extremely small. In some instances, the pixel area must be maintained below 0.024 sq. mm. It is equally important that a large number of display electrode are placed in the smallest area possible. Further, the conductors or wires which control the plurality of TFTs must be both transparent and extremely small in diameter or cross-sectional area. Transparent conductors are well known and are generally made of indium tin oxide. Even though the conductors are transparent, densely placed display electrodes generally require more conductor area in order to accommodate the increased number of pixels. Even if only a couple conductors are needed per pixel, the conductors will nevertheless occupy a substantial portion of the LCD total area. This leaves less area available for the pixel or display electrodes which are often forced to occupy the same plane as the conductors. Each display electrode must be spaced further from adjacent electrodes and must also be reduced in size in order to accommodate the control conductors placed between the electrodes. An increase in spacing can cause a noticeable reduction in the viewing quality. The image boundary may appear granular instead of being sharp and focused.

To more fully understand some of the concepts and problems outlined hereinabove, FIG. 1 illustrates an exploded view of LCD 10 according to a prior design. LCD 10 includes a pair of substantially transparent glass panels 12 and 14, and on the outer surface of each glass panel is a polarizer filter. Polarizer filter associated with panel 12 is denoted as reference numeral 16, and polarizer filter associated with panel 14 is denoted as reference numeral 18. On the inside surface of glass panel 12 is a common electrode 20, often called the backplane of the LCD, which extends across virtually the entire display surface. On the inside surface of glass panel 14 is a lithography produced topography comprising a matrix or grid of orthogonally placed conductors, active devices (or TFTs), and separate electrodes (or display electrodes). The conductors are used to carry video data and addressing signals sent from a remote source. Specifically, electrodes which receive video data are designated as bit lines 22, wherein the bit lines are shown spaced parallel from each other. Video data on one bit line can be read into a select display electrode 26 by a word line 24 spaced parallel to other word lines and substantially perpendicular to each bit line. Word lines 24 are thereby used to randomly address a select display electrode 26 with video data contained with a respective bit line 22. The addressing scheme and methodology is well known and generally follows standard dynamic random access memory (DRAM) multiplexing techniques. Placed adjacent each display electrode 26 is a pass-gate transistor 28 which, depending upon the voltage state upon its gate terminal, transmits bit line video data to electrode 36. Additional details regarding the layout and configuration of bit lines 22, word lines 24, display electrodes 26 and pass-gate transistors 28 are provided hereinbelow.

Placed over the inside surface topography of conductors 22 and 24, over transistors 28 and over display electrodes 26 is a dielectric layer (not shown) of sufficient insulative quality to electrically isolate bit lines 22, word lines 24, and transistors 28 from each other and from an adjacent liquid crystal medium 30. When brought together, liquid crystal medium 30 is in contact with the dielectric material and is in electric field contact with display electrodes 26 which are voided of dielectric material immediately thereabove by standard etching techniques. It is understood that alignment coatings and/or passivation coatings (not shown) are generally placed between electrode 20 and liquid crystal medium 30 as well as between each display electrode 26 and liquid crystal medium 30 to ensure current flow will not occur through the medium and that only electric field will be selectively present.

LCDs operate by either allowing the transferral of light or by blocking the transferral of light between the panels at select regions, often called "pixel regions" generally represented by the geometric size of individual display electrodes 28. Incoherent ambient light can be transmitted or reflected into one surface of LCD 10 allowing filter 18 to polarize light 32 to a coherent, linearly polarized state. The polarized light can either be re-aligned such that it passes through second filter 16 or, if electric field is present, the light can be blocked by second filter 16. Accordingly, sections of light or pixel regions can present themselves as relatively light or relatively dark areas necessary for visual contrast detection.

Referring now to FIG. 2, a three-dimensional circuit schematic of the active control matrix, including pass-gate transistors associated with a prior design LCD is shown. A plurality of cells forming a matrix are shown, each cell having a display electrode 26 connected to the source-drain path of pass-gate transistor 28. Each pass-gate transistor is activated by an appropriate voltage level upon its gate. Pass-gate transistors are manufactured upon glass panel 14 according to standard semiconductor processing and may be configured as thin-film, n-channel, enhancement-type MOSFETs. Once the voltage upon word line 24 exceeds a threshold amount, pass-gate transistor 28 allows video data within respective bit line 22 to pass through the source-drain path and onto display electrode 26. Common electrode 20 provides a uniform voltage state upon one side of liquid crystal media 30 such that electric field selectivity is entirely controlled by the voltage state of respective display electrodes 26 and its associated bit line 22 voltage.

Referring now to FIG. 3, a two-dimensional circuit schematic of the prior design active control matrix of FIG. 2 is shown. By activating a select word line 24, respective pass-gate transistor 28 allows a conductive path to form between an activated, associated bit line 22 and display electrode 26. Absent a buffering source placed on the charged terminal of the pass-gate transistor adjacent each display electrode, the data placed thereon may slowly discharge from its charged state to an illegible voltage state. Thus, many conventional control matrices must be periodically refreshed to ensure legible charge remains on the display electrode. Refresh generally forces, for example, a VGA controller to continuously update unchanged pixels thereby consuming valuable bandwidth access into the DRAM and reducing high performance LCD drawing operations.

In an effort to overcome the problem of having to continuously refresh unchanged pixels, a memory element 34 may be placed between pass-gate transistors 28 and display electrode 26 as shown in FIG. 4. As described in co-pending patent application Ser. No. 08/055,174 filed concurrently herewith, memory element 34, capable of receiving power, not only provides static memory but also buffers charge to the display electrode thereby increasing contrast and speed of the LCD. Coupled to each memory element 34 are a pair of conductors 36 and 38 capable of receiving power signals such as VDD and ground. Thus, each power signal or supply requires a conductor to extend a spaced distance from respective bit and word lines 22 and 24. Memory element consumes relatively small amounts of real estate when compared with the total area taken by the added power conductors extending across numerous, densely packed pixel elements. To compensate for the added conductor area, each pixel within the array or matrix must be reduced in size and the spacing between pixels increased. As described above, reduction in pixel size and increase in spacing adds to the granularity of the image and reduces the sharpness and fine line detail at the image boundary. Unless a solution can be found, high quality, high resolution LCDs having static memory and charge buffering capability cannot be obtained.

SUMMARY OF THE INVENTION

The problems outlined above are in large part solved by the LCD of the present invention. That is, the LCD hereof comprises a plurality of densely placed pixels or display electrodes arranged as an array across a display area. A control circuit is placed near the corner of each display electrode for controlling video information placeable on the display electrode. The control circuit includes a pass-gate transistor and may also include a memory element, the memory element being either passive or active. The memory element is preferably a static memory and provides buffered output to the respective display electrode. Each pass-gate transistor is coupled to receive two conductors (bit line and word line) and, depending upon the voltage state on the word line, transmit bit line video information to the memory element. The memory element can store for a virtually indefinite period of time the charge transmitted through the pass-gate transistor. The static memory element incorporates input from one or more power sources. A single power source, such as VDD, or two power sources, such as VDD and ground, are routed to each memory element via one or two conductors.

If a memory element is added requiring a power source, then at least one and possibly two additional conductors are needed. Accordingly, an LCD with memory and buffering capability requires up to four conductors which can be placed as two pairs of stacked conductors routed between rows and columns of display electrodes. An important aspect of the present invention is the geometric arrangement of the conductors (maximum of four) within the LCD array and the connection of those conductors to associated control circuitry.

Up to four conductors can be routed between densely spaced display electrodes by stacking paired conductors, one on top the other, with a suitable dielectric material placed therebetween. The stacked conductors appear as though a single conductor is routed between the spaced electrodes when viewed at an angle perpendicular to the coplanar display electrodes. By stacking the electrodes, two electrodes can be routed between rows of display electrodes to cross-over regions where those electrodes intersect with two other stacked electrodes routed between columns of display electrodes. The cross-over region is of sufficient area to accommodate the control circuit as well as a pair of stacked vias partially or completely surrounding the control circuit and between the control circuit and the outside corners of four adjacent display electrodes. The vias provide connection between the conductors and the control circuit, and also provide routing of the conductors through the cross-over region.

Broadly speaking, the present invention contemplates a liquid crystal display comprising at least four liquid crystal display electrodes spaced apart and arranged coplanar with each other upon a substrate having a substantially planar surface. A first elongated conductor extends along the planar surface and between two pairs of the four liquid crystal display electrodes. A second elongated conductor can extend along the planar surface substantially perpendicular to the first conductor and between another two pairs of the four liquid crystal display electrodes. Up to four conductors can therefore be utilized in stacked pairs to accommodate an addressable memory element and buffer requiring up to two power conductors.

A cross-over region exists between both pairs of the four liquid crystal display electrodes. The cross-over region is sized to accommodate a control circuit capable of addressing one of the display electrodes, and the cross-over region further comprising a pair of elongated vias extending along the planar surface dielectrically spaced substantially parallel to each other at a spacing distance perpendicular to the planar surface. The vias are adapted for connecting the first and second conductors to the control circuit and for routing the first and second conductors through the cross-over region without shorting those conductors to adjacent conductors or vias.

The present invention further contemplates a third elongated conductor is dielectrically spaced substantially parallel to the first conductor at a spacing distance perpendicular to the planar surface. Also, a fourth elongated conductor is dielectrically spaced substantially parallel to the second conductor at a spacing distance perpendicular to the planar surface. As defined herein, "dielectrically spaced" denotes a dielectric material of sufficient insulative quality placed between the first and third conductors, between the third and fourth conductors, between the pair of vias and between each conductor and each via such that complete conductive isolation is achieved for each conductor and each via, and that no shorting and substantial capacitive cross-coupling occurs therebetween. It is further understood that the first and third conductors, the second and fourth conductors, and the vias are stacked such that when viewed at an angle perpendicular to the display surface, the conductors and vias appear as a single conductor and via, respectively. It is understood that stacking denotes substantially parallel spacing of the conductors and vias with respect to each other, and that the spacing distance extends perpendicular to the planar surface such that the conductors and vias consume minimum area taken along a plane parallel to the display surface.

The present invention still further contemplates a pair of vias arranged in four diagonally extending branches, wherein each branch includes a portion of the pair of vias. The first and second conductors are respectively connected to two vias within one branch of the four branches, the first and fourth conductors are respectively connected to two vias within another branch of the four branches, the second and third conductors are respectively connected to two vias within still another branch of the four branches, and the third and fourth conductors are respectively connected to two vias within yet another branch of the four branches. Each branch provides a termination point for receiving ohmic contact with the first, second, third or fourth conductor.

The present invention even still further contemplates a control circuit having a pass-gate transistor and a memory element. The two input terminals of the pass-gate transistor is connected such that (i) both terminals are connected to the pair of vias within one of the four branches, or (ii) one terminal is connected to a via within one branch while the other terminal is connected to a via within another branch. Likewise, the memory element may require a single power source or two power sources. If two power sources are needed, the memory element can be connected to receive (i) two vias within a single branch, or (ii) a via within one branch and another via within another branch. The arrangement of stacked vias and stacked conductors placed in close proximity to the control circuit and associated display electrode provides flexibility in connecting the conductors and associated vias to the respective pass-gate transistor, memory element and display electrode. Connection flexibility allows alternative layout configuration of the control circuitry and can provide mask and field programmability for user specific applications.

BRIEF DESCRIPTION OF THE DRAWINGS

Other objects and advantages of the invention will become apparent upon reading the following detailed description and upon reference to the accompanying drawings in which.

Figure 1:
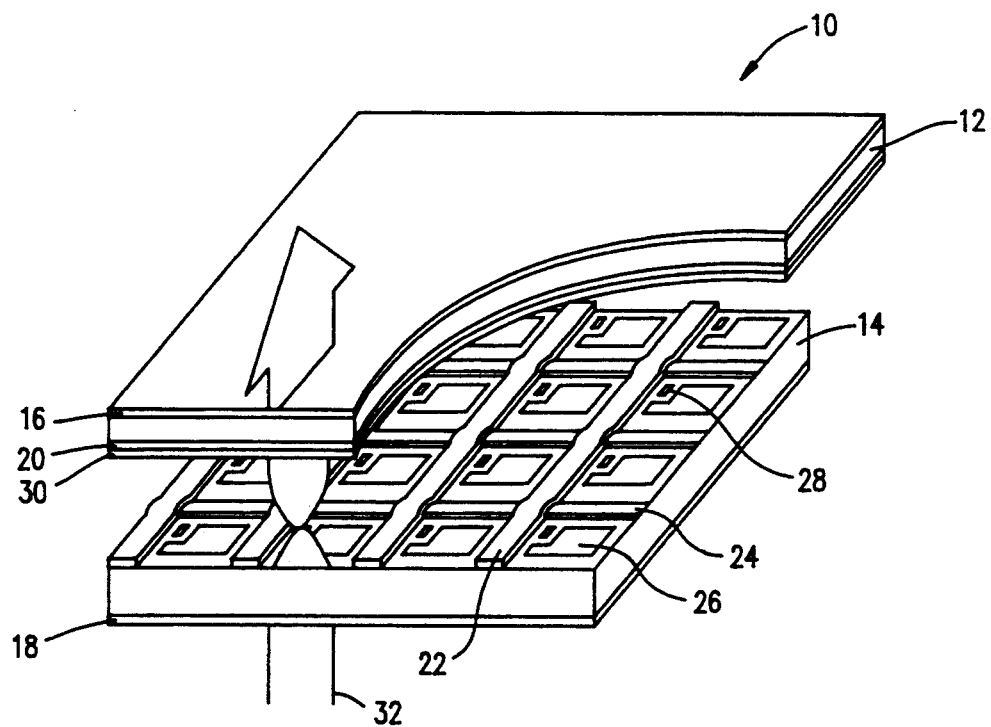
FIG. 1 is a exploded perspective view of a LCD according to a prior design.
Figure 2:
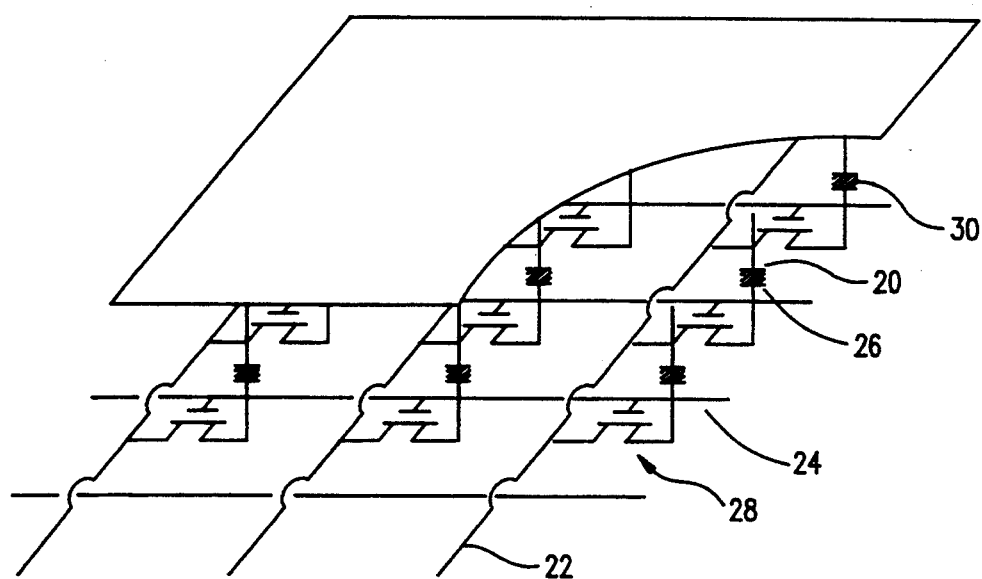
FIG. 2 is a three-dimensional circuit schematic of the control matrix and pass-gate transistors associated with the prior design LCD shown in FIG. 1.
Figure 3:
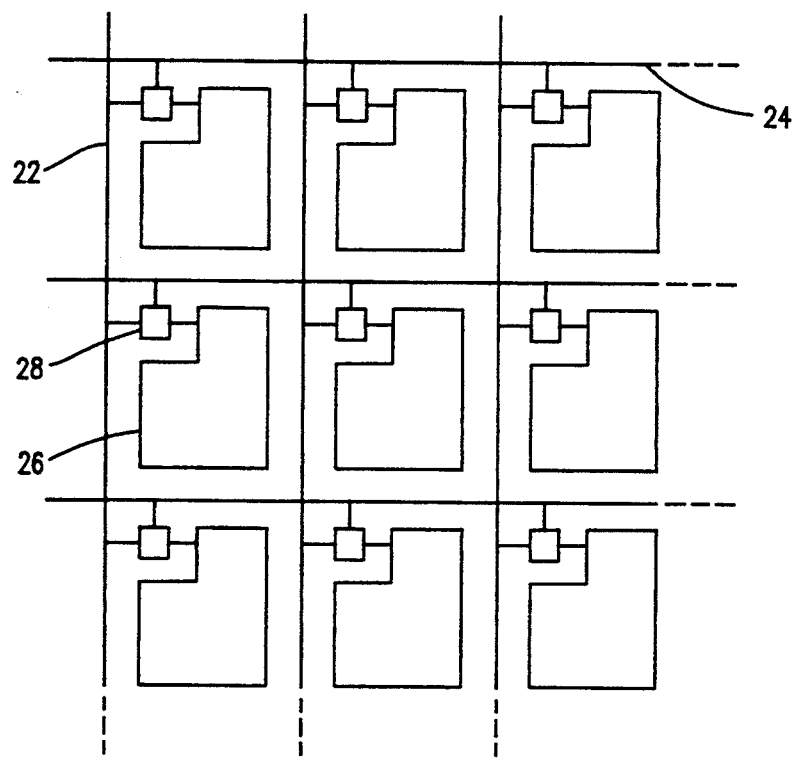
FIG. 3 is a two-dimensional circuit schematic of nine liquid crystal cells and associated active matrix addressing placed within an array according to a prior design LCD.
Figure 4:
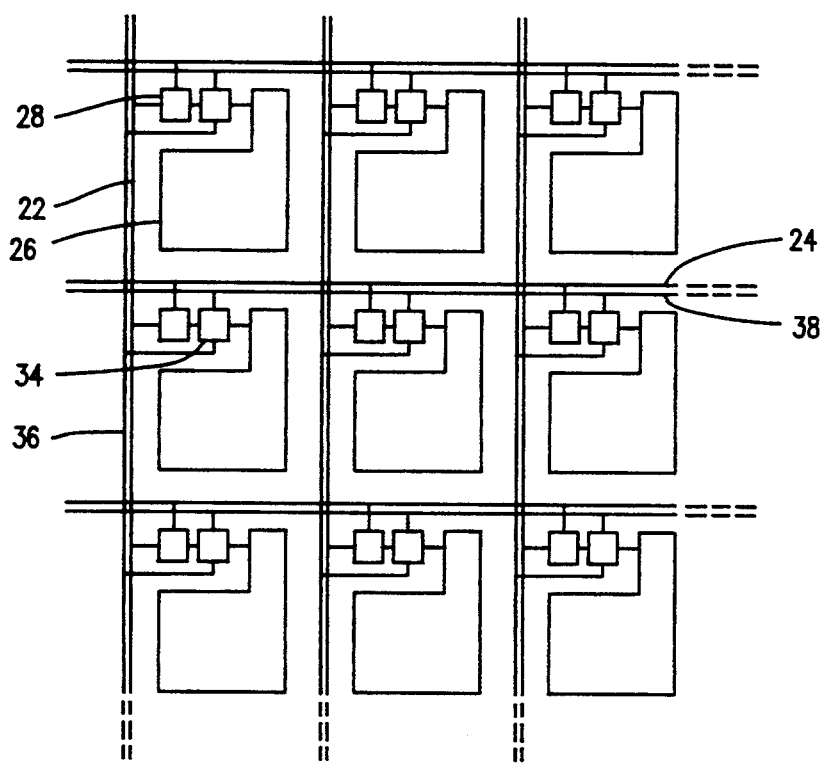
FIG. 4 is a circuit schematic of the two-dimensional circuit schematic of FIG. 4 modified to accommodate a memory element with buffer output.

While the invention is susceptible to various modifications and alternative forms, specific embodiments thereof are shown by way of example in the drawings and will herein be described in detail. It should be understood, however, that the drawings and description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE INVENTION

Figure 5:
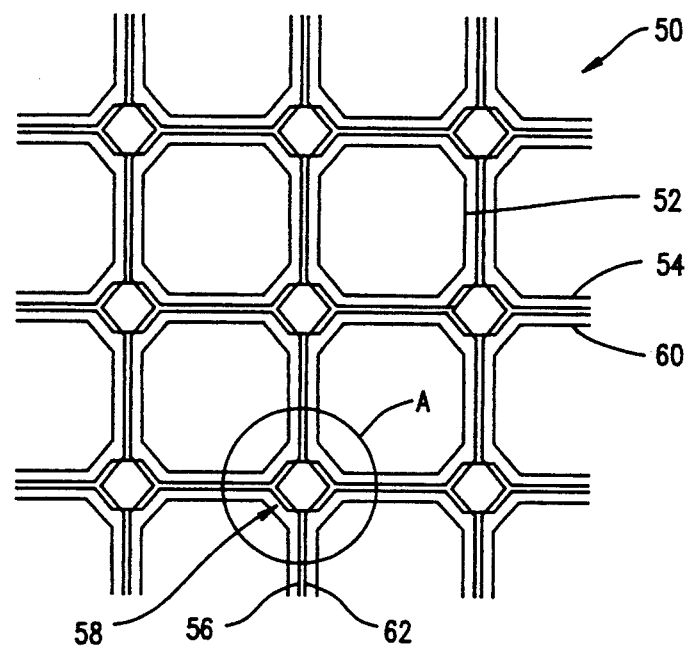
FIG. 5 is a plan view of a LCD active matrix utilizing two pairs of stacked conductors, each pair of stacked conductors arranged between rows and columns of display electrodes and which intersect at cross-over regions according to the present invention.

Turning now to the drawings, FIG. 5 is a plan view of an array of liquid crystal cells densely spaced to accommodate a high resolution LCD 50 of the present invention. Arranged parallel to each other and extending between display electrodes 52 is a plurality of first conductors 54. Extending perpendicular to each first conductor 54 and between display electrodes 52 is a plurality of second conductors 56. First and second conductors 54 and 56 extend into cross-over regions 58.

Each cross-over region is bounded by corners of four adjacent electrodes 52.

Placed parallel to first and second conductors 54 and 56 are third and fourth conductors 60 and 62, respectively. To aid in illustration, conductor 60 is drawn to the side of conductor 54, and conductor 62 is drawn to the side of conductor 56. However, it is understood that conductors 54 and 60 are arranged as a stacked pair, and that conductors 56 and 62 are also a stacked pair. When viewed from an angle perpendicular to the planar surface of LCD 50, conductor 60 will be substantially hidden beneath conductor 54, and conductor 62 will be substantially hidden beneath conductor 54. Thus, the thickness or diameter of only one conductor will appear between the array of electrodes 52 thereby achieving a closer spacing between electrodes. The spacing corresponds to the diameter or cross-sectional area of one stacked conductor and necessary dielectric spacing between the conductor and electrode 52. Accordingly, LCD 50 shown in FIG. 5 can accommodate up to four conductors (i.e., two pairs of stacked conductors) necessary for buffer and memory applications.

Figure 6:
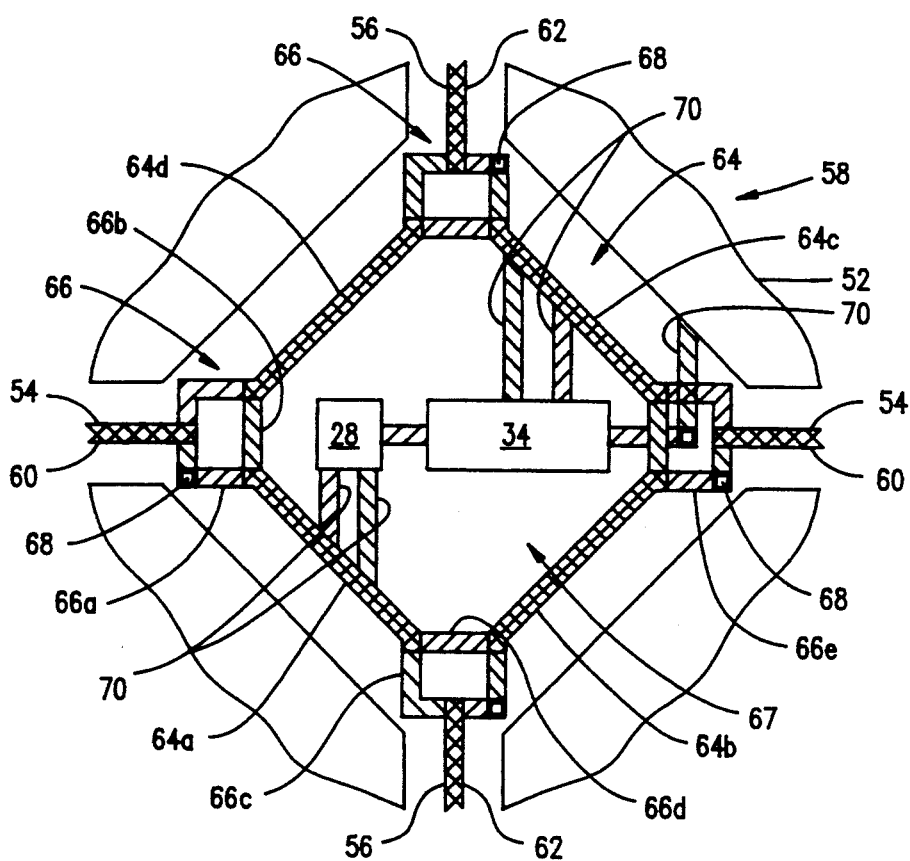
FIG. 6 is a detail view of area A shown in FIG. 5 according to one embodiment of the present invention.

To provide routing of one conductor within a stack to (i) control circuit (not shown in FIG. 5), and (ii) through cross-over region 58 to the other side, a stacked pair of vias and associated contacts at an end of one or more vias are necessary. FIG. 6 illustrates a detailed enlarged view of cross-over region 58 along area A. Arranged at the intersection of stacked conductors 54, 56, 60 and 62 is a pair of stacked vias 64 which provide connection between the conductors and control circuit 67. Specifically, FIG. 6 shows an exemplary connection between vias 64 and control circuit 67. Other connection configurations will be shown in FIGS. 7–9 and will be described hereinbelow.

Via 64 includes four diagonally arranged branches 64a, 64b, 64c and 64d. Each branch accommodates a portion of the stacked pair of vias and each branch includes a termination point 66. Termination point 66 comprises an extension at the ends of both pairs of vias from their stacked arrangement. Branch 64a is shown having extensions 66a, 66b, 66c, and 66d at the ends of branch 64a.

To aid in explanation, first conductor 54 and second conductor 56 are shown with 135° cross hatching, while third conductor 60 and fourth conductor 62 are shown with 45° cross hatching. First conductor 54 is coupled to extension 66a by way of contact 68 and extension 66a, and extends along one via of branch 64a and into a via of branch 64b by way of extension 66d. First conductor 54 further extends from branch 64b through region 58 by way of extension 66e and contact 68. Note that contacts 68 provide a conductive implant or riser extending perpendicular to the planar surface, the implant connects the end of an upper via extension to a lower via extension or vice versa. Similar to the upper and lower vias within each branch, upper extension vias are shown having cross hatching dissimilar from the lower extension cross hatching. Third conductor 60, shown with 45° cross-hatching, extends through one via of branches 64d and 64c to an opposing side of region 58. Contact 68 is used to provide connection between the extension at the ends of branches 64d and 64c. Still further, second conductor 56, shown with 135° cross-hatching, can extend through cross-over region 58 by connection with one via within branches 64d and 64a. Fourth conductor 62, shown with 45° cross-hatching, is coupled through region 58 over one via within branches 64c and 64b.

It is important to note that each branch contains a stacked pair of vias, and each stacked via is shown cross-hatched dissimilar from the other to aid in understanding the present invention. An end of each via extends from its stacked arrangement and is either connected directly to another extension of another branch at the same level or plane, or it is connected indirectly by contact 68 to another extension of another branch at another level or plane. Accordingly, the stacked vias of each branch can accommodate every conceivable combination of signals sent through first, second, third and fourth conductors. Further, signals sent over stacked vias and conductors maintain their integrity (i.e., do not short or cross-couple) to adjacent vias and conductors as they are routed through the cross-over regions. As an example, branch 64a may be coupled to receive first and second conductors, branch 64b may be coupled to receive first and fourth conductors, branch 64c may be coupled to receive third and fourth conductors and branch 64d may be coupled to receive second and third conductors.

Control circuit 67 is arranged inside the octagonal path formed by branches 64 and extensions 66. Control circuit 67 includes a pass-gate transistor 28 and a memory element 34. The source and gate terminals of pass-gate transistor 28 are coupled, respectively, to receive bit line and word line signals sent over a pair of conductors. As an example, bit line information can be sent over conductor 54 and through one via within branch 64a to the source terminal of transistor 28. Meanwhile word line signals can be sent over conductor 56 and through one via of branch 64d and 64a to the gate terminal of transistor 28. Memory element 34 can include a latching circuit requiring two power signals (e.g., VDD and ground) necessary to store and buffer charge information upon a respective display electrode 52. Particularly, VDD signal can be sent over third conductor 60 and through branch 64d and 64c until arriving at memory 34. Ground or VSS signal can be sent through fourth conductor 62 by way of one via within branch 64c to memory element 34. Routing conductors 70 connect, or tap, to select vias within branches to provide the necessary bit and word line address to transistor 28 as well as power to memory element 34. As shown in FIG. 6, routing 70 is placed specifically at the tap points along branches 64a and 64c. Another routing conductor 70 can attach the output of memory element 34 to a respective display electrode 52.

Figure 7:
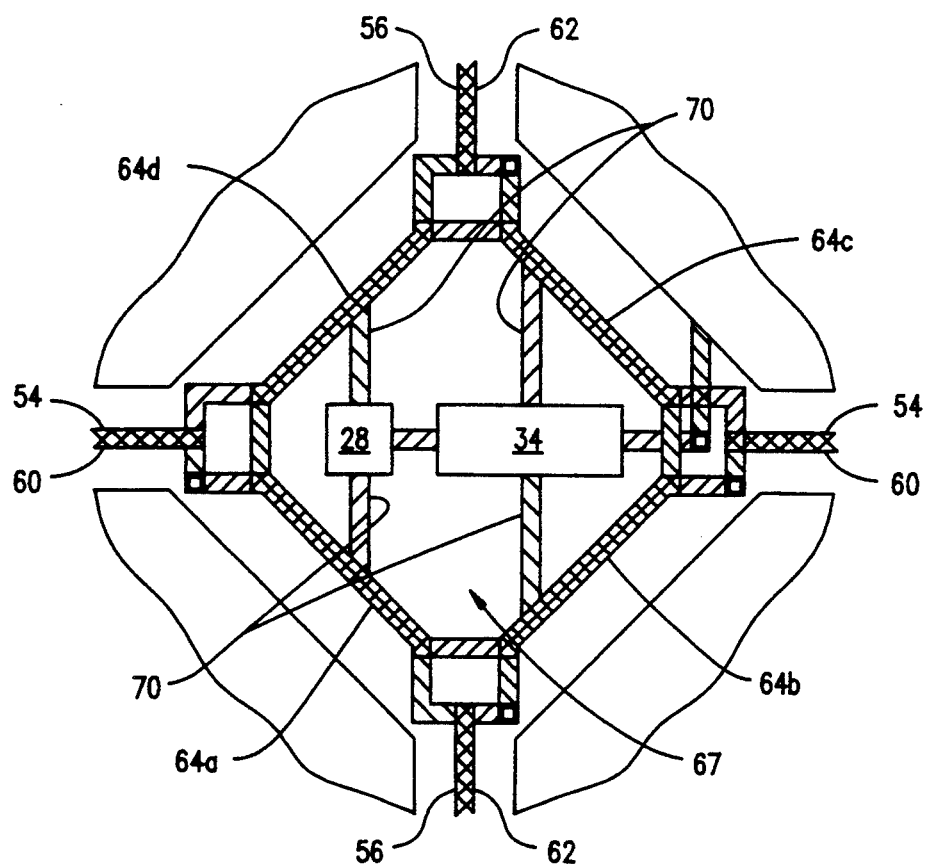
FIGS. 7-9 are detail views of alternative embodiments along area A cross-over region according to the present invention.

Turning now to FIG. 7, an alternative routing scheme for connecting control circuit 67 and vias 64 is shown. Instead of source and gate connection of transistor 28 taken from the same branch, as shown in FIG. 6, they can be taken from a via within separate branches as shown in FIG. 7. By altering the tap points, conductors 70 can accommodate differing layout connect points for transistor 28 as well as memory element 34. Regardless of whether the source and gate inputs are arranged at opposing sides or at the same side of the transistor layout area, conductors 70 can be routed from various tap points surrounding the layout area. Likewise, VDD and ground tap points can be at opposing sides or on the same side of memory element 34. A word line signal placed on second conductor 56 can, for example, extend into transistor 28 through one via of branch 64d, and the bit line signal can, for example, extend into transistor 28 through one via of branch 64a, as shown.

Figure 8:
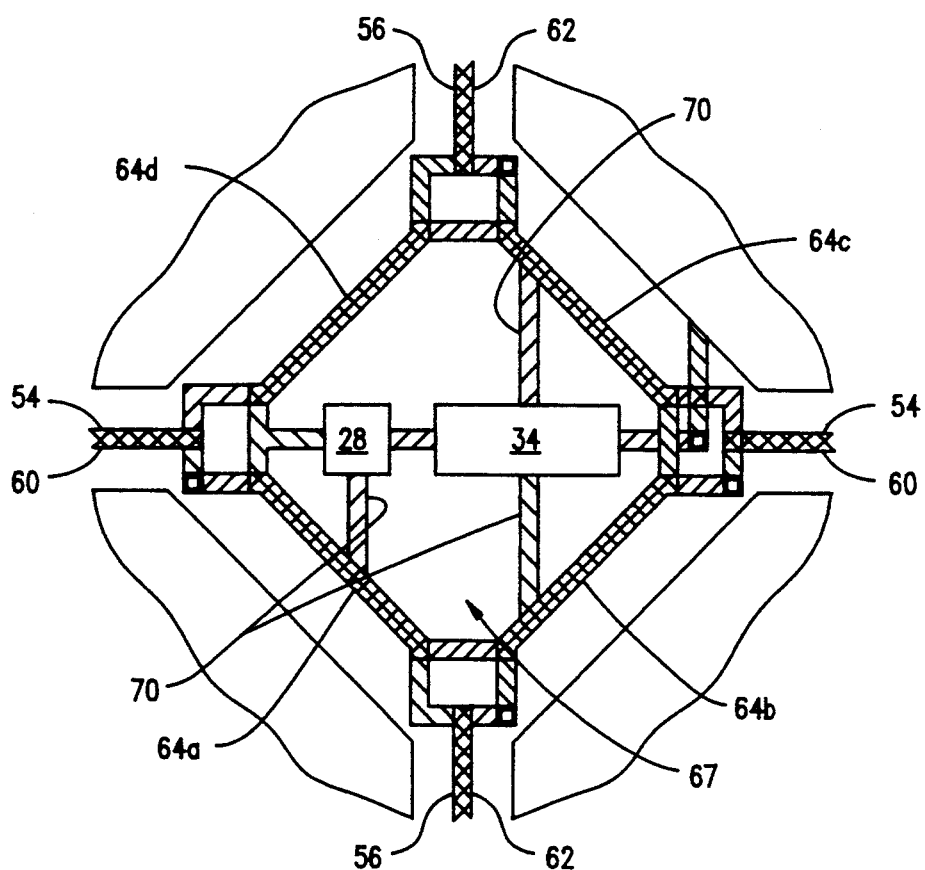

FIG. 8 illustrates yet another alternative routing scheme for connecting control circuit 67 to vias 64. One connection of either the bit line or the word line to transistor 28 can be made to an extension of one branch instead of the branch itself. The other connection, however, can be made to a via within the same branch or another branch. In the example shown, routing 70 can connect to an extension associated with branch 64d or 64a to provide word signal information to transistor 28. Word line signal can be sent from second conductor 56 through one via of branch 64d and to transistor 28 through the extension at one end of that via. Bit line information can be obtained by connection to branch 64a. VDD and ground connection is made by connecting routing 70 to branches 64c and 64d.

Figure 9:
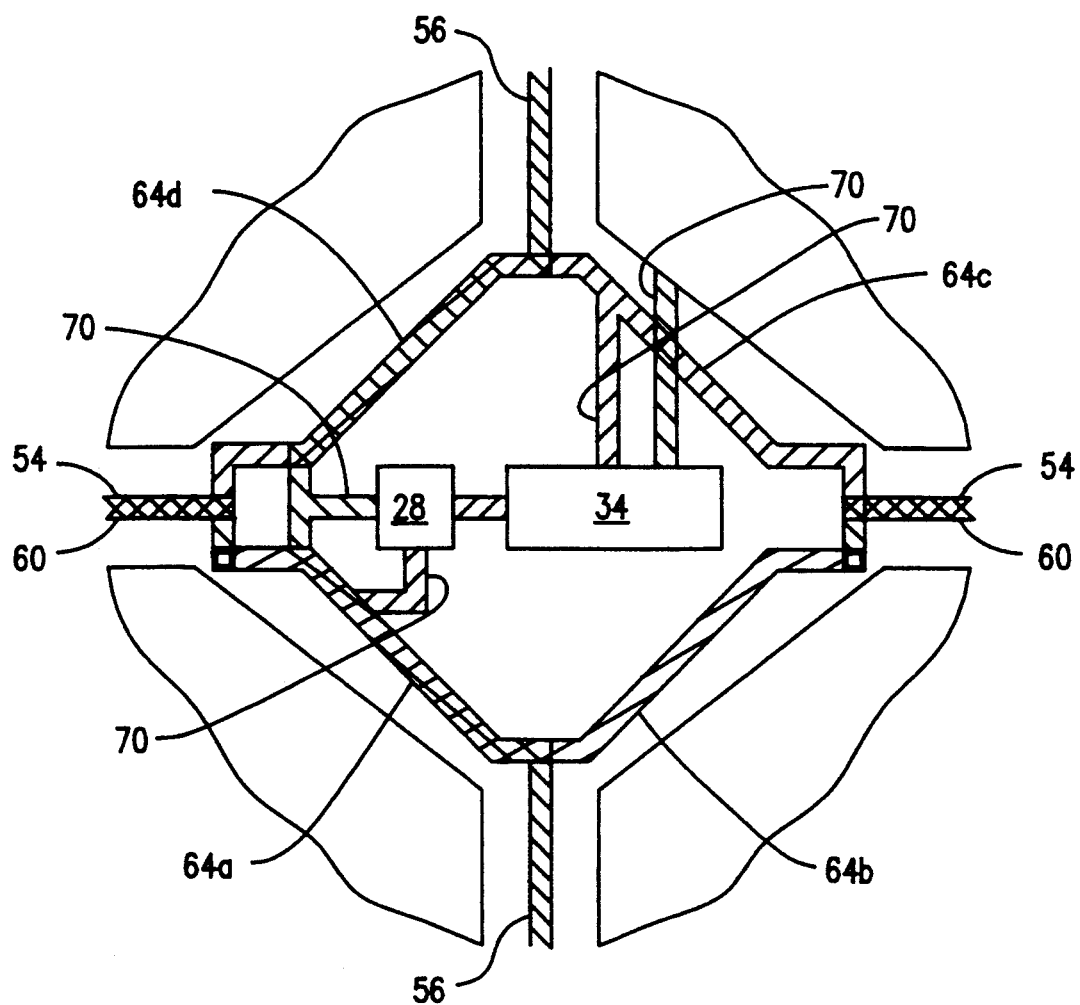

FIG. 9 illustrates yet another alternative routing scheme for connecting control circuit 67 to vias 64, where only three conductors are needed. A fourth conductor 62 need not be present. In particular, bit line and word line signals are sent through conductors 54 and 56, and conductor 60 provides a single power source to memory element 34. Memory element 34 thereby requires only a single power source as is normally the case in many DRAM applications. Therefore, it is appreciated that the embodiment of FIG. 9 can be used to present DRAM with refresh, while the embodiments of FIGS. 6-8 utilize static memory with full range buffer capability. Further, in a DRAM embodiment, requiring only a single power supply, there need be only three conductors. The conductors can be placed as two pairs of stacked conductors, wherein both conductors of one pair and only one conductor of the other pair is needed. Alternatively, only one pair of stacked conductors and a single conductor (not stacked with another conductor) can be routed through the array. In either case, the cross-over arrangement hereof can accommodate full routing (addressability and power) without any difference in routing area consumption.

It will be appreciated to those skilled in the art having the benefit of this disclosure that this invention is believed to be capable of applications with numerous types of LCDs and is preferably used in dot matrix LCDs having high quality, high resolution output. Furthermore, it is also to be understood that the form of the invention shown and described is to be taken as exemplary presently preferred embodiments. Various modifications and changes may be made without departing from the spirit and scope of the invention as set forth in the claims. An exemplary modification might be one which uses various forms of pass-gate transistors and/or memory elements placed at various layout configurations within the cross-over region. It is intended that the following claims be interpreted to embrace all such modifications and changes.

What is claimed is:

1. A liquid crystal display comprising:
   at least four liquid crystal display electrodes spaced apart and arranged coplanar with each other upon a substrate having a substantially planar surface;
   a first elongated conductor extending along said planar surface and between two pairs of said four liquid crystal display electrodes, and a second elongated conductor extending along said planar surface substantially perpendicular to said first conductor and between another two pairs of said four liquid crystal display electrodes; and
   a cross-over region between both pairs of said four liquid crystal display electrodes, said cross-over region is sized to accommodate a control circuit capable of addressing one of said liquid crystal display electrodes, and said cross-over region further comprising a pair of elongated vias extending along said planar surface and dielectrically spaced substantially parallel to each other a spacing distance perpendicular to said planar surface, said vias are configured for connecting said first and second conductors to said control circuit and for routing said first and second conductors through said cross-over region.

2. The liquid crystal display as recited in claim 1, further comprising a third elongated conductor dielectrically spaced substantially parallel to said first conductor a spacing distance perpendicular to said planar surface.

3. The liquid crystal display as recited in claim 1, further comprising a fourth elongated conductor dielectrically spaced substantially parallel to said second conductor a spacing distance perpendicular to said planar surface.

4. The liquid crystal display as recited in claim 1, wherein said pair of vias comprise four diagonally extending branches, each branch comprises a portion of said pair of vias.

5. The liquid crystal display as recited in claim 4, further comprising third and fourth elongated conductors dielectrically spaced substantially parallel to respective said first and said second conductors a spacing distance perpendicular to said planar surface, wherein said first and second conductors are respectively connected to two vias within one branch of said four branches, said first and fourth conductors are respectively connected to two vias within another branch of said four branches, said second and third conductors are respectively connected to two vias within still another branch of said four branches, and said third and fourth conductors are respectively connected to two vias within yet another branch of said four branches.

6. The liquid crystal display as recited in claim 5, wherein each of said four branches having a termination point comprising:
   an extension at one end of said pair of vias; and
   a contact at a distal end of said extension capable of ohmic connection with said first, second, third, or fourth conductor.

7. The liquid crystal display as recited in claim 6, wherein said contact comprises a conductive implant extending perpendicular to the planar surface between said extension and said first, said second, said third, or said fourth conductor.

8. The liquid crystal display as recited in claim 4, wherein select said branches further comprising a routing conductor extending along said planar surface between at least one of said vias and said control circuit.

9. The liquid crystal display as recited in claim 1, wherein said control circuit comprises:
   a pass-gate transistor having a gate and conductive path, said gate is connected to one of said pair of vias and said conductive path is connected between the other of said pair of vias and said display electrode; and
   a memory element connected to the other end of said conductive path and further connected to one of said four liquid crystal display electrodes.

10. The liquid crystal display as recited in claim 4, wherein said control circuit comprises:

a pass-gate transistor having a gate and conductive path, said gate and one end of said conductive path is connected, respectively, to said pair of vias within one of said four branches; and a memory element connected to the other end of said conductive path and further connected to a pair of vias within one of said four branches, said memory element having an output connected to the liquid crystal display electrode.

11. The liquid crystal display as recited in claim 4, wherein said control circuit comprises:

a pass-gate transistor having a gate and conductive path, said gate is connected to one of said pair of vias within one of said four branches and one end of said conductive path is connected to one of said pair of vias within another of said four branches; and a memory element connected to the other end of said conductive path and further connected to one of said pair of vias within one of said four branches and another one of said pair of vias within another of said four branches, said memory element having an output connected to one of said four liquid crystal display electrodes.

12. The liquid crystal display as recited in claim 4, wherein said control circuit comprises:

a pass-gate transistor having a gate and conductive path, said gate and one end of said conductive path is connected, respectively, to a pair of vias within one of said four branches; and a memory element connected to the other end of said conductive path and further connected to one of said pair of vias within one of said four branches and another one of said pair of vias within another of said four branches, said memory element having an output connected to the liquid crystal display electrode.

13. The liquid crystal display as recited in claim 4, wherein said control circuit comprises:

a pass-gate transistor having a gate and conductive path, said gate is connected to one of said pair of vias within one of said four branches and one end of said conductive path is connected to one of said pair of vias within another of said four branches; and a memory element connected to the other end of said conductive path and further connected to a pair of vias within one of said four branches, said memory element having an output connected to the liquid crystal display electrode.

14. A liquid crystal display comprising:

a pair of substantially transparent panels;

a liquid crystal medium hermetically sealed between said panels;

an array of liquid crystal display electrodes, said array comprises a plurality of four said liquid crystal display electrodes spaced apart and arranged coplanar with each other upon a substantially planar surface of one of said pair of panels;

a first elongated conductor extending along said planar surface between two pairs of said four liquid crystal display electrodes, and a second elongated conductor extending along said planar surface substantially perpendicular to said first conductor between another two pairs of said four liquid crystal display electrodes;

a third elongated conductor dielectrically spaced substantially parallel to said first elongated conductor a distance directly perpendicular to said planar surface;

a fourth elongated conductor dielectrically spaced substantially parallel to said second elongated conductor a distance directly perpendicular to said planar surface;

a cross-over region between both pairs of said four liquid crystal display electrodes, said cross-over region is sized to accommodate:

a control circuit;

four diagonally extending branches spaced from and extending partially around said control circuit, each branch comprising a pair of vias spaced substantially parallel to each other a distance directly perpendicular to said planar surface;

an extension of one of said pair of vias within each branch; and a contact placed at a distal end of said extension capable of ohmic connection with said first, said second, said third, or said fourth conductor.

15. The liquid crystal display as recited in claim 14, wherein said first and second conductors are respectively connected to said pair of vias within one branch of said four branches, said first and fourth conductors are respectively connected to said pair of vias within another branch of said four branches, said second and third conductors are respectively connected to said pair of vias within still another branch of said four branches, and said third and fourth conductors are respectively connected to said pair of vias within yet another branch of said four branches.

16. The liquid crystal display as recited in claim 14, wherein said contact comprises a conductive implant extending perpendicular to said planar surface between said extension and said first, said second, said third, or said fourth conductor.

17. The liquid crystal display as recited in claim 14, wherein vias within select said branches further comprising a routing conductor extending along said planar surface between at least one of said vias and said control circuit.

18. The liquid crystal display as recited in claim 14, wherein said control circuit comprises:

a pass-gate transistor having a gate and conductive path, said gate and one end of said conductive path is connected, respectively, to said pair of vias within one of said four branches; and a memory element connected to the other end of said conductive path and further connected to a pair of vias within one of said four branches, said memory element having an output connected to the liquid crystal display electrode.

19. The liquid crystal display as recited in claim 14, wherein said control circuit comprises:

a pass-gate transistor having a gate and conductive path, said gate is connected to one of said pair of vias within one of said four branches and one end of said conductive path is connected to one of said pair of vias within another of said four branches; and a memory element connected to the other end of said conductive path and further connected to one of said pair of vias within one of said four branches and another one of said pair of vias within another of said four branches, said memory element having an output connected to the liquid crystal display electrode.

20. The liquid crystal display as recited in claim 14, wherein said control circuit comprises:

a pass-gate transistor having a gate and conductive path, said gate and one end of said conductive path is connected, respectively, to said pair of vias within one of said four branches; and a memory element connected to the other end of said conductive path and further connected to one of said pair of vias within one of said four branches and another one of said pair of vias within another of said four branches, said memory element having an output connected to the liquid crystal display electrode.

21. The liquid crystal display as recited in claim 14, wherein said control circuit comprises:

a pass-gate transistor having a gate and conductive path, said gate is connected to one of said pair of vias within one of said four branches and one end of said conductive path is connected to one of said pair of vias within another of said four branches; and a memory element connected to the other end of said conductive path and further connected to a pair of vias within one of said four branches, said memory element having an output connected to the liquid crystal display electrode.

22. The liquid crystal display as recited in claim 14, wherein each said display electrode is orthogonally shaped along a plane substantially parallel to said planar surface.

* * * * *